ELECTRONIC VALVE CIRCUITS

Filed June 12, 1950

2 Sheets-Sheet 1

Lawrence Henry Bannister
Geoffrey Ord
Albert Maurel Uttley,
Spencer Watkins Noble
*Inventors*

By Moore and Hall
*Attorneys*

Sept. 8, 1953 A. M. UTTLEY ET AL 2,651,717

ELECTRONIC VALVE CIRCUITS

Filed June 12, 1950 2 Sheets-Sheet 2

Albert Maurel Uttley,
Spencer Watkins Noble
Lawrence Henry Bannister
Goeffrey Ord

*Inventors*

By Moore and Hall

*Attorneys*

Patented Sept. 8, 1953

2,651,717

UNITED STATES PATENT OFFICE 2,651,717

ELECTRONIC VALVE CIRCUITS

Albert M. Uttley, Great Malvern, Spencer W. Noble, Upper Colwall, Lawrence H. Bannister, Great Malvern, and Geoffrey Ord, Stockton-on-Tees, England, assignors to National Research Development Corporation, London, England, a British corporation Application June 12, 1950, Serial No. 167,662
In Great Britain June 22, 1949

13 Claims. (Cl. 250—27)

This invention relates to valve circuit arrangements which provide a number of stable conditions of operation and which may be triggered from one stable condition to another stable condition by means of a suitably applied signal. Such thermionic-valve trigger circuits having two stable conditions of operation are well known and it is the object of the present invention to provide trigger circuits of this general type which have three or more stable conditions of operation. Such circuits having, for example, three states of stable equilibrium find application in circuits of binary-digital machines in which the digits "0" and "1" are represented by pulse signals of opposite polarity while the absence of a pulse signal in a digit position indicates a failure of the apparatus.

To obtain a trigger circuit having a plurality of stable states the present invention makes use of the properties of amplifier circuits in which there are provided conditional, or non-linear, feedback paths which are effective only over specified ranges of output signal voltage level.

According to the present invention in one aspect, there is provided an electronic trigger circuit having at least three stable conditions of operation comprising a direct coupled amplifier channel in which the output bears a known relationship to the input and two positive feedback channels arranged to operate to provide positive feedback in response to outputs at two different basic threshold levels lying above and below a datum output level, whereby the circuit can be driven by an input signal to assume one of a number of stable conditions of operation corresponding to an output level lying between said basic threshold levels or to output levels lying above the upper or below the lower of said basic threshold levels.

According to a feature of the invention there is provided a further positive feedback channel arranged to become operative in response to an output at an associated primary threshold level lying above the upper of said basic threshold levels and a negative feedback channel arranged to become operative to oppose the operative positive feedback channel when the output reaches an associated secondary threshold level interposed between the upper basic threshold level and said primary threshold level.

According to a further feature of the invention one or more further positive feedback channels is/are provided and arranged to become operative in response to outputs at a still higher associated primary threshold level or progressively higher associated primary threshold levels and an equal number of further negative feedback channels is/are provided arranged to become operative at a secondary threshold level or levels each lying between two of said primary threshold levels.

Each feedback channel as it becomes operative is arranged to override the algebraic sum of the feedback already in the circuit. That is to say that the introduction of a positive feedback channel into the circuit is arranged to make the gain around the circuit greater than unity and the introduction of a negative feedback channel into the circuit is arranged to make the gain around the circuit less than unity.

According to the invention in another aspect there is provided an electronic trigger circuit having at least three stable conditions of operation, comprising a direct coupled amplifier channel in which the output bears a known relationship to the input, at least two positive feedback channels arranged to become operative in response to outputs at progressively higher associated primary threshold levels all lying above a datum output level and a negative feedback channel or channels arranged to become operative at a secondary threshold level or levels arranged so that a secondary threshold level lies between each two adjacent primary threshold levels.

It will be understood that the alternation of the primary and secondary threshold levels detailed above may equally well be arranged to occur below as above the datum output level.

The nature of the invention will be more clearly understood from the following description given with reference to the accompanying drawings, which relate to a trigger circuit according to the invention which comprises essentially two direct-coupled amplifiers connected in tandem and having a conditional positive feedback loop connected from the output of the second amplifier to the input of the first amplifier. The existence of the second amplifier is not essential to the operation of the invention in principle but it is provided as a practical convenience as a phase-reverser for obtaining the positive feedback signal at an appropriate D. C. level.

Figure 1:
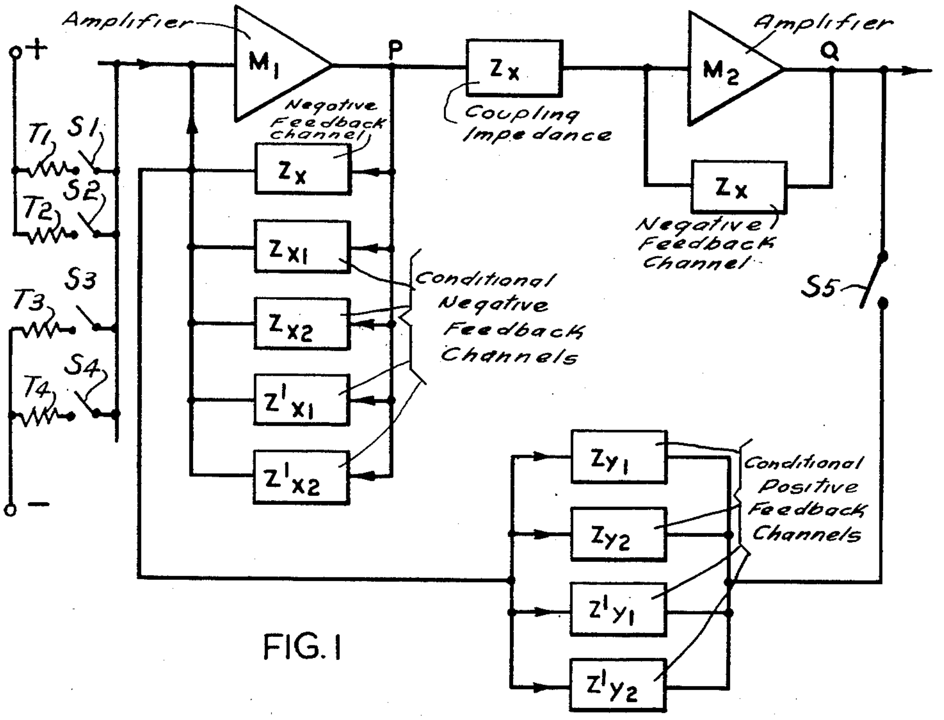
Fig. 1 shows a block schematic diagram of the trigger circuit.

$M_1$ and $M_2$ are direct-coupled phase reversing amplifiers, each provided with a negative feedback network $Zx$ and the output point P of amplifier $M_1$ is connected to the input of amplifier $M_2$ via a similar impedance $Zx$. Positive feedback is obtained by connecting the output point Q of amplifier $M_2$ to the input of amplifier $M_1$ through impedances $Zy_1$, $Zy_2$, $Z'y_1$ and $Z'y_2$. These impedances provide conditional positive feedback paths, the magnitude of the impedances being dependent upon the output voltage at point Q; they may be either infinite or finite in value depending upon the voltage at point Q and the positive feedback paths may be said to be voltage delayed. Voltage-delayed negative feedback impedances $Zx_1$, $Zx_2$, $Z'x_1$ and $Z'x_2$ are provided between the output and input of amplifier $M_1$.

Consider what happens when the impedances $Zy_1$, $Zy_2$, $Z'y_1$ and $Z'y_2$ are infinite. The other coupling impedance $Zx$ is arranged to be of high value compared with the output impedance of amplifier $M_1$ and does not modify the initial conditions existing in that amplifier. The amplifiers $M_1$ and $M_2$ are so designed that under these conditions $Zx_1$, $Zx_2$, $Z'x_1$ and $Z'x_2$ are infinite and no current flows into amplifier $M_2$ through the coupling impedance $Zx$. This is a stable condition, the quiescent condition. If an input signal is applied to amplifier $M_1$ which alters the voltage at point P and hence the voltage at point Q by a sufficient amount, a finite impedance at $Zy_1$, $Zy_2$, $Z'y_1$, and $Z'y_2$ will be brought into operation. Assume that the voltage at point Q has moved positively and that as a result $Zy_1$ has a finite value. A complete loop will exist around the circuit and by suitable choice of the values of $Zx$, $Zy_1$ and the forward gain of the amplifiers the overall gain round the loop can be made positive and greater than unity. The voltage at Q will thus be driven further positively by the regenerative action of the circuit and if no steps are taken to prevent it, the voltage at Q will change in the same direction until one or other of the amplifiers overloads, when the voltage at Q will be stabilised at the new level. In the same manner an initial negative-going change of voltage at Q, produced by a suitable input signal, may be caused to drive the circuit to a condition of stability, through regenerative action via impedance $Z'y_1$, in which the voltage at Q occupies a level negative with respect to the quiescent level.

Deliberate limiting is introduced before overloading of the amplifiers occurs in order to define accurately the output voltage levels in the triggered conditions of stability of the circuit. This limiting is produced by one or other of the conditional negative feedback impedances $Zx_1$, $Zx_2$, $Z'x_1$ and $Z'x_2$ which becomes of finite value when the voltage at point P changes by a given amount. Impedances $Zx_1$ and $Zx_2$ are arranged to assume a finite value when the voltage at P has changed by a given amount in one direction while impedances $Z'x_1$ and $Z'x_2$ are arranged to be effective for a voltage change of a given magnitude in the reverse direction. The negative feedback thus introduced is such as to reduce the gain of amplifier $M_1$ by an amount sufficient to make the overall gain less than unity; further movement of the voltage at point P or Q is thus prevented and in this condition the circuit is quite stable.

The performance of the circuit arrangement shown in Fig. 1 will now be described with reference to Fig. 2. The impedances $Zx_1$, $Zx_2$ and $Xy_1$, $Zy_2$ become effective for changes in output level in one direction while the other impedances $Z'x_1$, $Z'x_2$, $X'y_1$ and $X'y_2$ are effective for output level changes in the opposite direction. In Fig. 2, O is the origin, the vertical axis denotes the magnitude of feedback current while the horizontal axis denotes the output voltage.

Fig. 2 illustrates the variation in resultant feedback current $i$ to the input of the first amplifier $M_1$ as the output voltage $V_p$ is caused to vary by the application of an input signal (which may be regarded as a current fed to or drawn from the input point) to the input of amplifier $M_1$. The voltage $V_p$ will be proportional in magnitude and opposite in sign to the output voltage at point Q and either of these voltages can be used to indicate the triggered condition of the circuit and so represent the static information recorded by the circuit.

As above described, one stable condition of the circuit exists when the input current is zero and $V_p$ is at a datum output level defined as that corresponding to zero input and which is zero in this example since the negative feedback impedances $Zx_1$, $Zx_2$, $Z'x_1$, and $Z'x_2$, and the positive feedback impedances $Zy_1$, $Zy_2$, $Z'y_1$ and $Z'y_2$ are effectively infinite, by virtue of the back-biasing voltages used to set the thresholds for operation of these paths. An input or signal current $i_{in}$ now applied to the input will cause a feedback current $i_{f.b.}$ to flow round the feedback path to neutralise the input current. This will hold as long as the gain of amplifier $M_1$ is very high. This feedback current will flow, in this condition of the circuit only through the feedback impedance $Zx$ and will set up across it a voltage $Zxi_{f.b.}$ which will appear as a finite value of $V_p$.

The relationship between $i_{f.b.}$ and $V_p$ now follows the line OA of Fig. 2, and will hold until $V_p$ reaches the value $V_{p1}$, the upper basic threshold output value. The voltage at Q is then equal to $-VP_1$ which overcomes the threshold of impedance $Zy_1$. The total feedback current $i_{f.b.}$ is now shared between the impedances $Zx$ and $Zy_1$. The feedback through impedance $Zy_1$ is, however in the reverse sense to that through impedance $Zx$, being derived from point Q, and impedance $Zy_1$ being less in value than $Zx$ and the net effect will be as of positive feedback so that the relationship between $V_p$ and $i_{f.b.}$ will now follow the curve AB the slope of which is derived by adding the slope of OA to the slope of dotted curve AB which represents variation of feedback current with voltage in impedance $Zy_1$.

The increase of $V_p$ from $V_{p1}$ along the curve AB is self-maintaining and will therefore continue until, at point B the secondary threshold $V_{p2}$ of impedance $Zx_1$ is reached whereupon the impedance path $Zx_1$ is brought into action in parallel with $Zx$ and $Zy_1$. The variation of feedback current in $Zx_1$ with voltage follows the dotted curve *bd*. The effect of this impedance added to that of the impedances $Zx$ and $Zy_1$ is to give once more a positive slope BCD to the feedback-current/voltage relationship. In the absence of any change in $i_{in}$ the whole transition from A through B and C to point S is catastrophic and has the same effect as if the change took place according to the dotted line AS on the diagram. At point S the conditions are again stable, being represented by a state of balance between the input current $i_{in}$ and the total feedback current $i_{f.b.}$. Having arrived at this condition, if $i_{in}$ is further increased so that $i_{f.b.}$ reaches the point D, corresponding to $V_p=V_{p3}$ the primary threshold voltage $V_{p3}$ of $Zy_2$ will be reached and a further catastrophic transition will take place, bringing into operation the impedance $Zx_2$, and setting up in the circuit the conditions operative at point T on the curve.

If now, on the other hand, starting with the circuit in the condition represented by point S, $i_{in}$ is decreased, $i_{f.b.}$ and $V_p$ will follow the relationship represented by the line DB until at point B the threshold of impedance $Zx_1$ is passed, in the reverse direction so that this impedance path becomes inoperative. The conditions of the circuit will now change catastrophically to those represented by the point U on the curve, the process being similar to that described above for the transition from A to S but in this case the effect derives from the successive removal of feedback paths from operation.

The process can be extended in this negative-going sense as above described for the positive-going process, each stage in the negative-going progression being represented by the bringing into operation of the negatively back-biased impedance paths $Z'x_1$, $Z'x_2$, $Z'y_1$ and $Z'y_2$.

It will now be seen that the circuit has five stable regimes, represented by the lines of positive slope G'F'E' : D'C'B' : A'OA : BCD : EFG. Within each of these regimes the conditions set up in the circuit will be determined by the value of the input current $i_{in}$, which is equal and opposite to $i_{f.b.}$ For the circuit to operate as a trigger circuit it is arranged for each of these regimes to include the condition $i_{f.b.}=0$, so that in the absence of a triggering impulse the circuit will be stable in any one of the states corresponding to points F'C', O, C and F on the curve. Each of these points represents a value of $V_p$ which characterises the particular stable state. Appropriate changes of input current can, as indicated above carry the circuit from any one of these stable states into any other. For this purpose there are shown four triggering circuits $T_1$, $T_2$, $T_3$ and $T_4$, each appropriate to one of the four stable regimes (other than the quiescent condition) and each adapted to be brought into operation by means of its respective switch $S_1$, $S_2$, $S_3$ or $S_4$. Each circuit comprises a suitable resistor chosen so that, when connected to a source of potential the appropriate input current is fed to the amplifier M, to establish the corresponding regime. $T_1$ and $T_2$ are shown connected to a positive source to supply a positive current to enable regimes G'F'E' and D'C'B' to be set up, while $T_3$ and $T_4$ are connected to a negative source to enable regimes BCD and EFG to be set up.

In a circuit of this kind it is convenient in many cases to treat the condition 0, referred to above as the quiescent condition, as a standard condition to which the circuit is returned after use. Provision may be made for the circuit to be reset to this condition from any condition in which it may be, by rendering inoperative the feedback path from the point Q. This provision has been indicated on Fig. 1 in the form of a switch $S_5$ by which the feedback path may be broken.

Figure 2:
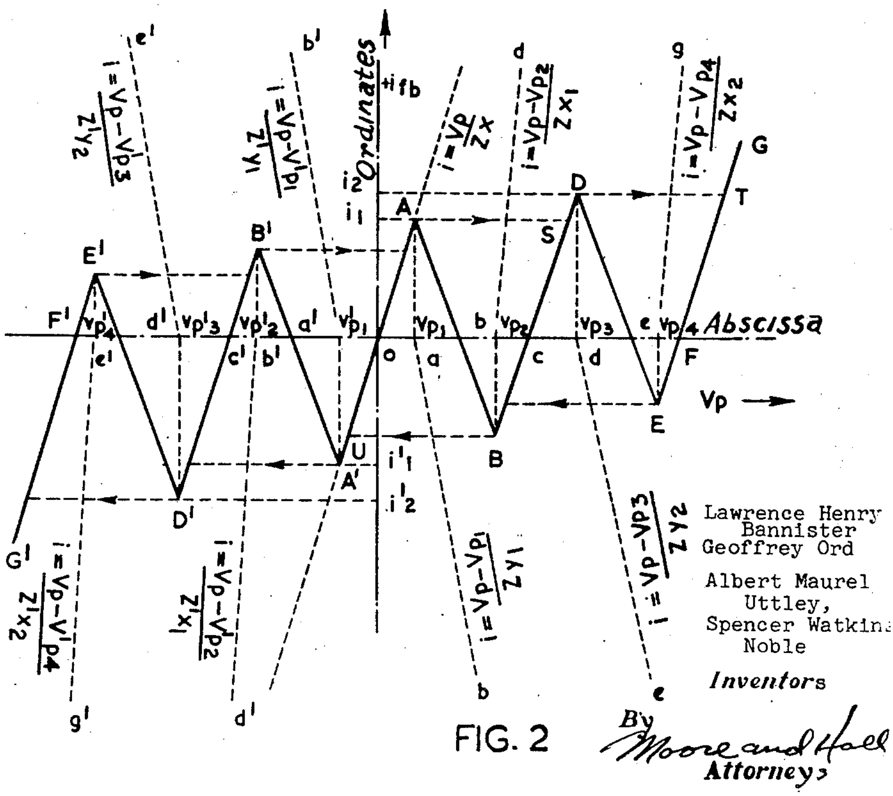
Fig. 2 is an explanatory diagram showing the mode of operation of the arrangement illustrated in Fig. 1.
Figure 3:
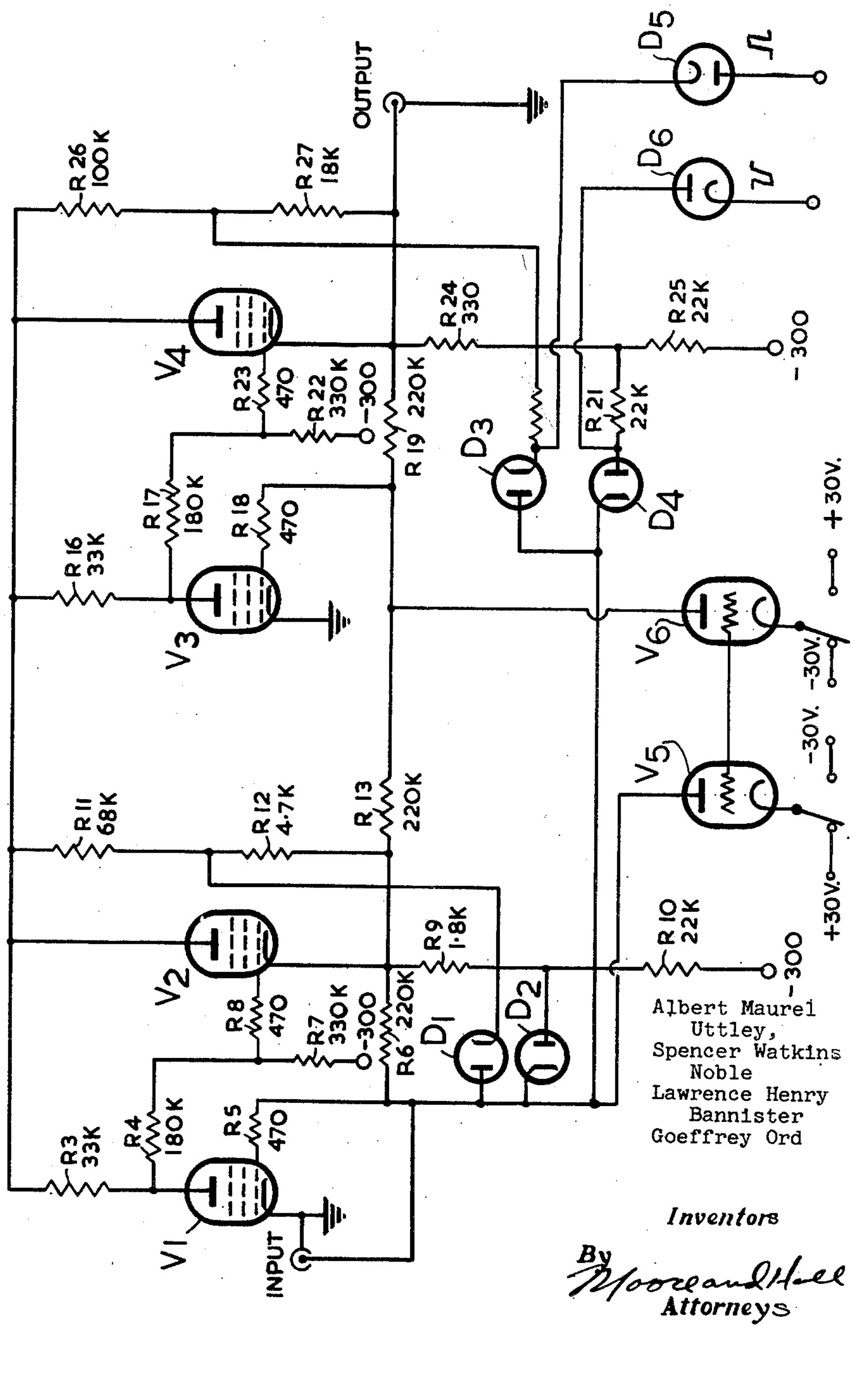
Fig. 3 is a circuit diagram of a practical embodiment of the invention.

A practical realisation of the system of Fig. 1 is illustrated in Fig. 3. The two direct-coupled amplifiers are provided by valves V1 and V3 and in association with these valves are cathode-follower stages V2 and V4 respectively which provide outputs from the amplifiers at low impedance. The cathode loads of V2 and V4 are returned to a suitable negative potential source and the cathodes of V2 and V4 provide the output points from which the voltage levels generated by the trigger circuit are obtained. Unconditional negative feedback is applied to amplifier V1 by means of the resistor R6 coupling the cathode of V2 to the grid of V1, and a similar unconditional negative feedback is provided on the amplifier V3 by resistor R19. The conditional positive feedback loops are provided by connecting the grid of V1 through the diodes D3, D4 to points which have suitable D. C. potentials and which vary in potential in step with the cathode of V4. Conditional negative feedback loops are provided for amplifier V1 by diodes D1 and D2 which connect the grid of V1 to points which vary in sympathy with the cathode of V2 and have suitable D. C. potentials. The output from the amplifier V1, V2 is coupled to the input of the amplifier V3, V4 via resistor R13.

In the quiescent state the voltage at the cathode of V2 (point P of Fig. 1) is substantially the same as the voltage at the grid of V1 which will adjust itself to say −2 volts. Similarly the grid of valve V3 will also adjust itself to approximately −2 volts and no current will flow through the coupling resistor R13. None of the diodes will be conducting.

If a small current $+\lambda I$ is now fed to the grid of V1 the voltage at the cathode of V2 will change by an amount $-R6\pi I$ to compensate for this change. The resultant potential difference across the coupling resistor R13 will then feed a current of $$\frac{-R6\lambda I}{R13}$$

to the grid of valve V3 which will in turn produce a voltage change of $$\frac{+R6\lambda I}{R13}R19$$

at the cathode of V4. If the values of resistors R6, R13 and R19 are equal the voltages at the cathodes of V2 and V4 will thus move in push-pull. If λIR19 exceeds the delay voltage across the resistor R24 (5 volts) which is applied to the diode D4, that diode will conduct and current will flow to the grid of V1 in positive feedback sense. If it is arranged that the resistor R21 in the positive feedback path is equal to $\frac{1}{10}$R6 the gain from the cathode of V4 to the cathode of V2 under these conditions will be 10. This means that there is a positive gain greater than unity around the circuit and the voltage at the cathode of V4 continues to move in a positive direction and the voltage at the cathode of V2 continues to move in a negative direction. This movement goes on until the change in voltage at the cathode at V2 exceeds the delay voltage across the resistor R12 (30 volts approximately) and the diode D1 is caused to conduct. The gain of V1 and V2 is then considerably reduced and the positive feedback action is stopped the circuit then being in a stable condition. If initially a negative current has been fed to the grid of V1 a similar action would have occurred but in this case the diode D3 would have conducted to give positive feedback when the delay voltage across resistor R27 was overcome by the negative excursion of the cathode of V4 and the diode D2 would have conducted to bring into operation the limiting negative feedback path when the voltage at the cathode of V2 had moved sufficiently in the positive direction to overcome the delay voltage across resistor R9.

When the circuit has been triggered to either of the conditions described above it may be returned to its quiescent stable state by interrupting the positive feedback loop in some manner. This interruption of the positive feedback loop may be conveniently effected by applying, through diodes D5 and D6, a positive pulse to the cathode of diode D3 and a negative pulse to the cathode of diode D4. Only one of these pulses of course will be necessary to interrupt the feedback path but the simultaneous application of both pulses will ensure that the circuit is retriggered irrespective of its triggered conditions.

In practice it is convenient to trigger the circuit in one direction by feeding negative current to the grid of V1 and to trigger to the other conditions by feeding negative current to the grid of V3. These operations may be readily carried out by providing two triggering valves, conveniently triodes, V5 and V6, the anodes of which are connected to the grids of V1 and V3 respectively. The control grids of these valves are normally biassed well beyond cutoff, say to −50 volts with respect to earth, but the bias is lifted by a suitable gate pulse applied to the valve grids from terminal G when triggering of the circuit is desired. The triggering action is controlled by returning the cathodes of valves V5 and V6 to suitable potentials. It is arranged that the cathode of one valve is returned to say −30 volts with respect to earth while the cathode of the other valve is returned to say +30 volts with respect to earth if triggering in one direction is desired. These potentials are applied to the valve cathodes, in the example shown, through switches $S_6$ and $S_7$ which enable the appropriate potential for each cathode to be selected.

When the triggering valves are then gated on at their grids by the pulse applied to their grids, only that valve the cathode of which is returned to −30 volts (valve V5 with the switches $S_6$ and $S_7$ in the positions shown) will conduct and cause the grid of the valve V1 (or with the switches reversed V3) to which it is connected, to move negatively.

We claim:

1. An electronic trigger circuit having at least three stable conditions of operation comprising an input terminal, an output terminal, a direct coupled linear amplifier channel connected between said input terminal and said output terminal, two positive feedback channels connected across at least part of said amplifier channel and inhibiting means connected in each of said positive feedback channels to prevent their operation when the amplifier channel output lies between associated threshold levels which lie one on each side of a datum output level.

2. An electronic trigger circuit having at least three stable conditions of operation comprising an input terminal, an output terminal, a direct coupled linear amplifier channel connected between said input terminal and said output terminal, three positive feedback channels connected across at least part of said amplifier channel, a negative feedback channel connected across at least part of said amplifier channel, control means connected in each of said feedback channels to render it operative and means connected to each of said control means for applying a bias thereto to prevent its operation when the output of said amplifier channel falls short of a threshold level, two of said positive feedback channels being operative from basic threshold levels, said basic threshold levels lying one on each side of a datum output level; the third of said positive feedback channels being operative from a primary threshold level removed from said datum output level beyond one of said basic threshold levels; and said negative feedback channel being operative from a secondary threshold level interposed between said primary threshold level and the same one of said basic threshold levels.

3. An electronic trigger circuit having at least three stable conditions of operation comprising an input terminal, an output terminal, a direct coupled linear amplifier channel connected between said input terminal and said output terminal, at least fourth positive feedback channels connected across at least part of said amplifier channel, at least two negative feedback channels connected across at least part of said amplifier channel, control means connected in each of said feedback channels to render it operative and means for applying a bias thereto to prevent its operation when the output of said amplifier channel falls short of a threshold level, two of said positive feedback channels being operative from two basic threshold levels, said basic threshold levels lying one on each side of a datum output level; each further positive feedback channel being operative from primary threshold levels removed from said datum output level progressively further beyond one of said basic threshold levels; and each of said negative feed back channels being operative from secondary threshold levels interposed singly between the same one of said basic threshold levels and the next succeeding primary threshold level and between each primary threshold level and the next primary threshold level further removed from said datum output level.

4. An electronic trigger circuit having at least three stable conditions of operation comprising an input terminal, an output terminal, a direct coupled linear amplifier channel connected between said input terminal and said output terminal, two positive feedback channels connected across at least part of said amplifier channel, a negative feedback channel connected across at least part of said amplifier channel, control means connected in each of said feedback channels to render it operative and means connected to each of said control means for applying a bias thereto to prevent its operation when the output of said amplifier channel falls short of a threshold level, one of said positive feedback channels being operative from a basic threshold level lying on one side of a datum output level; the second of said positive feedback channels being operative from a primary threshold level removed from said datum output level beyond said basic output level; and said negative feedback channel being operative from a secondary threshold level interposed between said primary threshold level and said basic threshold level.

5. An electronic trigger circuit having at least three stable conditions of operation comprising an input terminal, an output terminal, a direct coupled linear amplifier channel connected between said input terminal and said output terminal, at least three positive feedback channels connected across at least part of said amplifier channel, at least two negative feedback channels connected across at least part of said amplifier channel, control means connected in each of said feedback channels to render it operative and means connected to each of said control means for applying a bias thereto to prevent its operation when the output of said amplifier channel falls short of a threshold level, one of said positive feedback channels being operative from a basic threshold level lying on one side of a datum output level; each positive feedback channel being operative from primary threshold levels respectively removed from said datum output level progressively further beyond said basic threshold level; and each of said negative feedback channels being operative from secondary threshold levels respectively interposed singly between said basic threshold level and the next succeeding primary threshold level and between each primary threshold level and the next primary threshold level further removed from said datum output level.

6. An electronic trigger circuit having at least three stable conditions of operation comprising an input terminal, an output terminal, a direct coupled linear amplifier channel connected between said input and said output terminal, two positive feedback channels connected across at least part of said amplifier channel, two negative feedback channels connected across at least part of said amplifier channel, control means connected in each of said feedback channels to render it operative and means connected to each of said control means for applying a bias thereto to prevent its operation when the output of said amplifier channel falls short of a threshold level, the two positive feedback channels being operative from two basic threshold levels lying one on each side of a datum output level; and the two negative feedback channels being operative from two further threshold levels removed from said datum output level one beyond each basic threshold level.

7. An electronic trigger circuit having at least three stable conditions of operation comprising an input terminal, an output terminal, a direct coupled linear amplifier channel connected between said input terminal and said output terminal, three positive feedback channels connected across at least part of said amplifier channel, three negative feedback channels connected across at least part of said amplifier channel, control means connected in each of said feedback channels to render it operative and means connected to each of said control means for applying a bias thereto to prevent its operation when the output of said amplifier channel falls short of a threshold level, two of said positive feedback channels being operative from two basic threshold levels lying one on each side of a datum output level; the third of said positive feedback channels being operative from a primary threshold level removed from said datum output level beyond one of said basic threshold levels, one of said negative feedback channels being operative from a secondary threshold level interposed between said primary threshold level and the same one of said basic threshold levels; and the remaining negative feedback channels being operative from two further threshold levels removed from said datum output level one beyond the other of said basic output levels and the other beyond said primary threshold level.

8. An electronic trigger circuit having at least three stable conditions of operation comprising an input terminal, an output terminal, a direct coupled linear amplifier channel connected between said input terminal and said output terminal, at least four positive feedback channels connected across at least part of said amplifier channel, at least four negative feedback channels connected across at least part of said amplifier channel, control means connected in each of said feedback channels to render it operative and means for applying a bias thereto to prevent its operation when the output of said amplifier channel falls short of a threshold level, two of said positive feedback channels being operative from two basic threshold levels lying one on each side of a datum output level; each of said further positive feedback channels being operative from primary threshold levels respectively removed from said datum output level progressively further beyond one of said basic threshold levels; each of said negative feedback channels being operative from secondary threshold levels respectively interposed singly between the same one of said basic threshold levels and the next succeeding primary threshold level and between each primary threshold level and the next primary threshold level further removed from said datum output level; and two of said negative feedback channels being operative from two further threshold levels removed from said datum output level one beyond the other of said basic threshold levels and the other beyond the primary threshold level furthest removed from said datum output level.

9. An electronic trigger circuit having at least three stable conditions of operation comprising an input terminal, an output terminal, a direct coupled linear amplifier channel connected between said input terminal and said output terminal, two positive feedback channels connected across at least part of said amplifier channel, two negative feedback channels connected across at least part of said amplifier channel, control means connected in each of said feedback channels to render it operative and means connected to each of said control means for applying a bias thereto to prevent its operation when the output of said amplifier channel falls short of a threshold level, one of said positive feedback channels being operative from a basic threshold level lying on one side of a datum output level; the second of said positive feedback channels being operative from a primary threshold level removed from said datum output level beyond said basic output level; one of said negative feedback channels being operative from a secondary threshold level interposed between said primary threshold level and said basic threshold level; and the other of said negative feedback channels being operative from a further threshold level removed from said datum output level beyond the primary threshold level.

10. An electronic trigger circuit having at least three stable conditions of operation comprising an input terminal, an output terminal, a direct coupled linear amplifier channel connected between said input terminal and said output terminal, at least three positive feedback channels connected across at least part of said amplifier channel, at least three negative feedback channels connected across at least part of said amplifier channel, control means connected in each of said feedback channels to render it operative and means connected to each of said control means for applying a bias thereto to prevent its operation when the output of said amplifier channel falls short of a threshold level, one of said positive feedback channels being operative from basic threshold level lying on one side of a datum output level; each of said positive feedback channels being operative from primary threshold levels respectively removed from said datum output level progressively further beyond said basic threshold level; each of said negative feedback channels being operative from secondary threshold levels, respectively interposed singly between said basic threshold level and the next succeeding primary threshold level and between each primary threshold level and the next primary threshold level further removed from said datum output level; and one of said negative feedback channels being operative from a further threshold level removed from said datum output level one beyond the furthest primary threshold level.

11. An electronic trigger circuit having three stable conditions of operation comprising an input terminal, an output terminal, a linear amplifier channel comprising two valve stages connected between the input terminal and the output terminal, two positive feedback channels connected across said amplifier channel, two negative feedback channels connected across the first stage of said amplifier channel, a unilaterally conducting device connected in each of said feedback channels, and a source of bias connected to each unilaterally conducting device to prevent its conduction when the output of said amplifier channel falls short of a threshold level, the two positive feedback channels being operative from two basic threshold levels lying one on each side of a datum output level; the two negative feedback channels being operative from two further threshold levels removed from said datum output level one beyond each basic threshold level.

12. An electronic trigger circuit having at least three stable conditions of operation comprising an input terminal, an output terminal, a linear amplifier channel comprising two valve stages connected between the input terminal and the output terminal, at least four positive feedback channels connected across said amplifier channel, at least four negative feedback channels connected across the first stage of said amplifier channel, a unilaterally conducting device connected in each of said feedback channels, and a source of bias connected to each unilaterally conducting device to prevent its conduction when the output of said amplifier channel falls short of a threshold level, two of said positive feedback channels being operative from two basic threshold levels lying one on each side of a datum output level; each further positive feedback channel being respectively operative from primary threshold levels removed from said datum output level progressively further beyond one of said basic threshold levels; each of said negative feedback channels being respectively operative from secondary threshold levels interposed singly between the same one of said basic threshold levels and the next succeeding primary threshold level and between each primary threshold level and the next primary threshold level further removed from said datum output level; and two of said negative feedback channels being respectively operative from two further threshold levels removed from said datum output level one beyond the other of said basic threshold levels and the other beyond the primary threshold level furthest removed from said datum output level.

13. An electronic trigger circuit having three conditions of stable operation comprising an input terminal, an output terminal, a linear negative feedback amplifier channel connected between said input terminal and said output terminal, said amplifier channel having two stages of amplification each consisting of a valve amplifier followed by a cathode follower, two positive feedback channels connected between said output terminal and said input terminal, each channel including a unilaterally conducting device in series therewith, biassing means applied to each unilaterally conducting device to provide two bias potentials, lying one on each side of the input potential, to each respective device to render it non-conductive when the output level falls short of the respective bias level, further unilaterally conducting devices connected to said positive feedback channels and a further source of bias applied to each of said further unilaterally conducting devices to render it non-conducting when the output falls short of a predetermined level at which the positive feedback conveyed by its associated feedback channel is to be limited.

ALBERT M. UTTLEY.
SPENCER W. NOBLE.
LAWRENCE H. BANNISTER.
GEOFFREY ORD.

References Cited in the file of this patent

UNITED STATES PATENTS

| Number | Name | Date |
|---|---|---|
| 2,423,931 | Etter | July 15, 1947 |
| 2,471,262 | Cousins | May 24, 1949 |

OTHER REFERENCES

"A Three State Flip-Flop," by Booth et al., page 133 of Electrical Engineer, April 1951.